(12) United States Patent
Hagiwara

(10) Patent No.: US 10,990,331 B2
(45) Date of Patent: Apr. 27, 2021

(54) PRINT CONTROL DEVICE, NON-TRANSITORY COMPUTER-READABLE MEDIUM, AND PRINT CONTROL METHOD

(71) Applicant: Oki Data Corporation, Tokyo (JP)

(72) Inventor: Suguru Hagiwara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/716,740

(22) Filed: Dec. 17, 2019

(65) Prior Publication Data

US 2020/0272370 A1 Aug. 27, 2020

(30) Foreign Application Priority Data

Feb. 22, 2019 (JP) .............................. JP2019-030133

(51) Int. Cl.
*G06F 15/00* (2006.01)
*G06F 3/12* (2006.01)
*G06K 1/00* (2006.01)

(52) U.S. Cl.
CPC .......... *G06F 3/1205* (2013.01); *G06F 3/1254* (2013.01); *G06F 3/1258* (2013.01)

(58) Field of Classification Search
CPC ..... G06F 3/1205; G06F 3/1254; G06F 3/1258
USPC ................ 358/1.15, 1.13, 1.14, 1.1
See application file for complete search history.

(56) References Cited

U.S. PATENT DOCUMENTS

| | | | |
|---|---|---|---|
| 9,122,431 B2 * | 9/2015 | Nakagawa ............. | G06F 3/1205 |
| 2008/0204805 A1 * | 8/2008 | Ming ...................... | G06F 3/1253 |
| | | | 358/1.16 |
| 2010/0296122 A1 * | 11/2010 | Mitsui .................... | G06F 3/1204 |
| | | | 358/1.15 |
| 2016/0253132 A1 * | 9/2016 | Nishida ................. | G06F 3/1204 |
| | | | 358/1.15 |
| 2017/0060488 A1 * | 3/2017 | Oya ....................... | G06F 3/1224 |
| 2017/0147912 A1 * | 5/2017 | Hiramoto ............. | G06K 15/189 |

FOREIGN PATENT DOCUMENTS

JP 2018-036721 A 3/2018

* cited by examiner

*Primary Examiner* — Douglas Q Tran
(74) *Attorney, Agent, or Firm* — Rabin & Berdo, P.C.

(57) ABSTRACT

The information processing device 100 includes a control unit 105 that executes an application for processing a print object and a printer driver for controlling a printer 120, a display unit 102 that displays a screen, and an input unit 101 that receives an input of an instruction. When the control unit 105 receives an instruction to display a print setting screen for setting print settings of the printer 120 in the application through the input unit 101, the control unit 105 executes the printer driver and causes the display unit 102 to display a print setting screen in a modeless dialogue in which use of functions in the application is not restricted to setting print settings.

10 Claims, 5 Drawing Sheets

PRINT CONTROL DEVICE, NON-TRANSITORY COMPUTER-READABLE MEDIUM, AND PRINT CONTROL METHOD

BACKGROUND OF THE INVENTION

1. Field of the Invention

The present invention relates to a print control device, a program, and a print control method.

2. Description of the Related Art

Conventionally, as disclosed in Japanese Patent Application Publication No. 2018-36721, when an application performs a print that a user desires, the user, for example, makes a display to display a print setting screen for performing print setting and performs setting desired print on the print setting screen.

The print setting screen is a screen for inputting print settings used by the printer drivers of each manufacturer in order for the user to set print settings such as paper type, paper size, output layout, or color adjustment, and each manufacturer provides respective screens adapted for each printer.

This print setting screen is called on a process of an application which has opened the print object document. Therefore, the print setting screen is activated in a modal dialogue in which the device is restricted to use of a specific function (in this case, printing), and the user cannot operate another part of the screen of the application while the print setting screen is opened.

Therefore, in conventional arts, when any setting is changed in the print setting screen, it is necessary to close the print setting screen in order to apply the settings. This is because in order for the application to apply the print settings set on the print setting screen and perform printing, the print settings entered on the print setting screen is provided to the application and the application issues a print command using the provided print settings. In the conventional arts, the print settings entered in the print setting screen is applied to the application by closing the print setting screen.

SUMMARY OF INVENTION

A print control device according to an aspect of the present invention causes a print device to perform printing. The print control device includes a processing circuitry that executes an application for processing a print object that is an object to be printed by the print device and a printer driver for controlling the print device; a display device that displays a screen; and an input device that receives an instruction. When the processing circuitry receives an instruction to display a print setting screen for setting print settings of the print device in the application through the input device, the processing circuitry executes the printer driver and causes the display device to display the print setting screen in a modeless dialogue in which use of functions in the application is not restricted to setting print settings.

A non-transitory computer-readable medium according to an aspect of the present invention is a non-transitory computer-readable medium storing a program that causes a computer to function as a print control device for causing a print device to perform printing. The program causes the computer to function as: a processing circuitry that controls the print device; a display device that displays a screen; and an input device that receives an instruction. When the processing circuitry receives an instruction to display a print setting screen for setting print settings of the print device through the input device in an application executed by the processing circuitry, the processing circuitry causes the display device to display the print setting screen on the display device in a modeless dialogue in which use of functions in the application is not restricted to setting the print setting.

A print control method according to an aspect of the present invention includes receiving, in an application for processing a print object that is an object to be printed by a print device, an instruction to display a print setting screen for setting print settings of the print device; and displaying the print setting screen in a modeless dialogue in which use of functions in the application is not restricted to setting print settings, by executing a printer driver for controlling the print device.

DETAILED DESCRIPTION OF THE INVENTION

Figure 1:
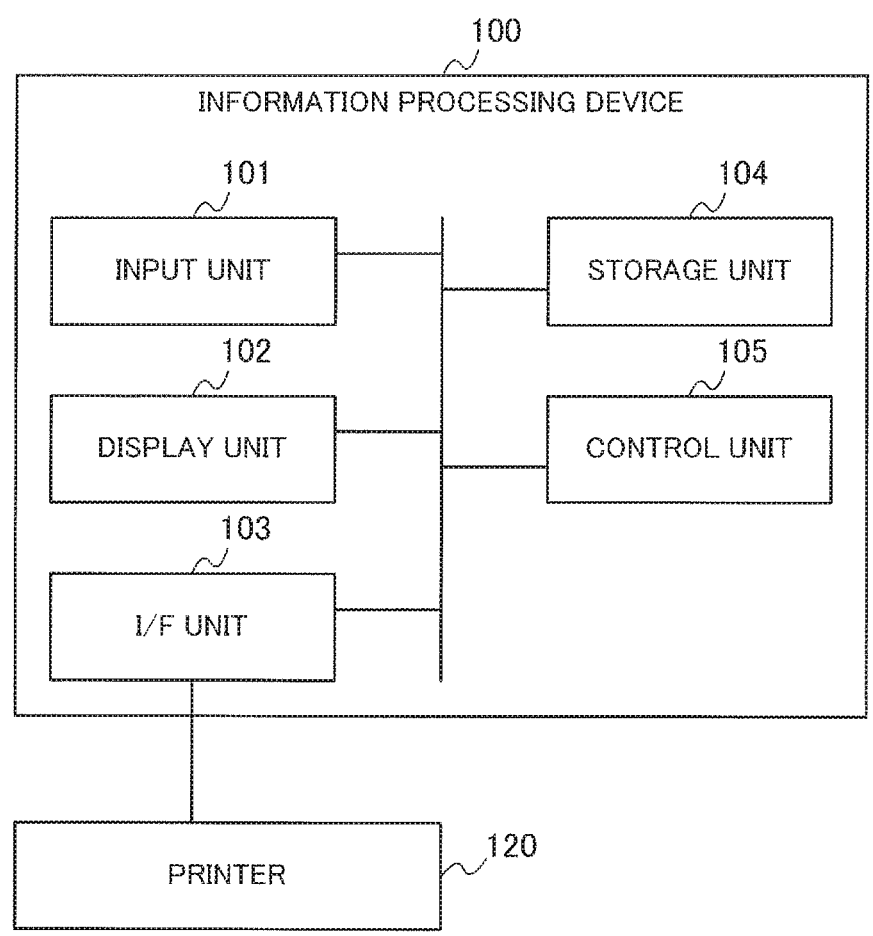
FIG. 1 is a block diagram schematically illustrating a configuration of an information processing device functioning as a print control device according to an embodiment.

FIG. 1 is a block diagram schematically illustrating a configuration of an information processing device 100 which is a print control device according to an embodiment.

The information processing device 100 includes an input unit 101, a display unit 102, an interface unit (hereinafter referred to as I/F unit) 103, a storage unit 104, and a control unit 105. The information processing device 100 causes a printer 120 as a print device to perform printing.

The input unit 101 receives input of an instruction.

The display unit 102 displays various screens. In this embodiment, an application screen and a print setting screen are displayed.

The I/F unit 103 is an interface that can be connected to the printer 120. The information processing device 100 communicates with the printer 120 via the I/F unit 103.

The storage unit 104 stores information and programs necessary for performing processing in the information processing device 100.

The control unit 105 controls processing in the information processing device 100.

For example, the control unit 105 executes applications for processing a print object to be printed by the printer 120 and a printer driver for controlling the printer 120. When receiving an instruction to display the print setting screen of the printer driver from an application, the control unit 105 executes a setting application for setting print settings in a modeless dialogue which is not a modal dialogue that restricts use of the function of the application to printing, thereby causing the display unit 102 to display the print setting screen.

Here, a modal dialogue is defined as a mode in which, when a print setting screen is called in an application, the use of another function of the application is not restricted even while the print setting screen is opened.

A modeless dialogue is defined as a mode in which, when a print setting screen is called in an application, the use of another function of the application is restricted while the print setting screen is opened.

Then, the control unit 105 receives the setting from the input unit 101 by using the print setting screen displayed on the display unit 102. When receiving a print instruction from the application, the control unit 105 generates print data by using the print settings set on the print setting screen instead of the print settings instructed by the application. The generated print data is sent to the printer 120 via the I/F unit 103 to execute printing.

The printer 120 acquires the print data from the information processing device 100 and executes printing based on the print data.

Figure 2:
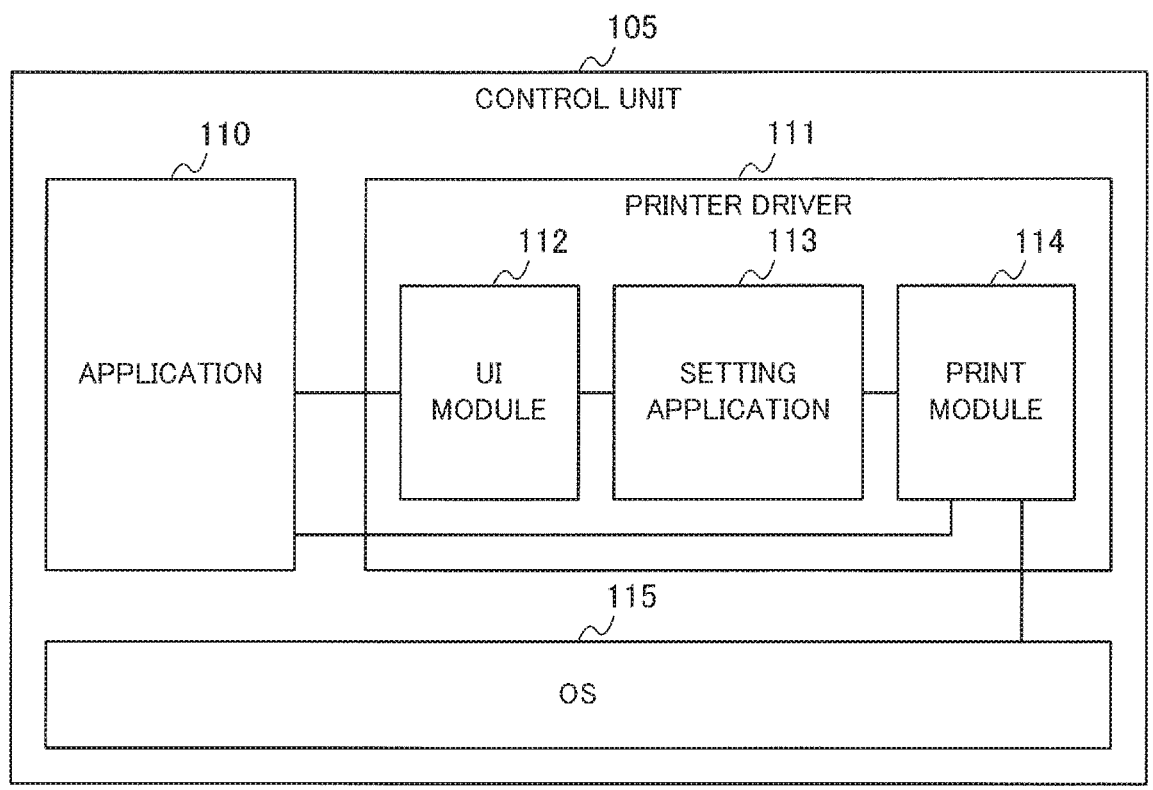
FIG. 2 is a block diagram schematically illustrating a configuration of a programs to be executed by a control unit.

FIG. 2 is a block diagram schematically illustrating a configuration of the programs to be executed by the control unit 105.

The programs to be executed by the control unit 105 includes an application 110, a printer driver 111, and an operation system (OS) 115. The functions of the application 110, the printer driver 111, and the OS 115 described below are activated when the control unit 105 executes these programs. Therefore, when the control unit 105 executes the application 110, the control unit 105 functions as an application unit (not shown). When the control unit 105 executes the printer driver 111, the control unit 105 functions as a printer driver unit (not shown). When the control unit 105 executes the OS 115, the control unit 105 functions as an OS unit (not shown).

The application 110 is a program that provides predetermined functions for processing such as creating or browsing with respect to a print object document. For example, the application 110 receives input of a display instruction of the print setting screen and a print instruction via the input unit 101. When receiving the display instruction of the print setting screen, the application 110 provides to the printer driver 111 a call instruction as an instruction to call the print setting screen. When receiving the print instruction, the application 110 provides the printer driver 111 with print instruction data including document data (print object data) which are data of a document as a print object and application print settings as print settings set in the application 110.

The printer driver 111 is a program that provides functions of printing by the printer 120.

For example, when the application 110 receives an instruction to display a print setting screen, the printer driver 111 displays the print setting screen on the display unit 102 in a modeless dialogue in which use of functions of the application 110 is not restricted to setting print settings.

When the application 110 receives an instruction to print a print object after the print setting screen is displayed on the display unit 102, the printer driver 111 causes the printer 120 to print the print object with the print settings set on the print setting screen while the print setting screen is being displayed on the display unit 102.

The printer driver 111 includes a user interface module (hereinafter referred to as UI module) 112 as a first module, a setting application 113 as a second module, and a print module 114 as a third module.

The UI module 112 is activated in response to a call instruction from the application 110. Then, the UI module 112 activates the setting application 113 by calling of the setting application 113 in a modeless dialogue. The UI module 112 terminates its operation when it gets the calling operation of the setting application 113 done.

The setting application 113 is activated by being called from the UI module 112. The setting application 113 causes the display unit 102 to display a print setting screen for setting print settings in a modeless dialogue separately from the process of the application 110, and accepts that print settings are set via the input unit 101. It should be noted that the print settings set in the setting application 113 are referred to as driver print settings.

The print module 114 generates print data for printing the print object. For example, the print module 114 receives the print instruction data from the application 110 and generates the print data by using the print instruction data in accordance with the activation state of the setting application 113.

Specifically, when the setting application 113 is activated from the application 110, the print module 114 generates print data by using the document data included in the print instruction data and the driver print settings set by the setting application 113. Here, the driver print settings are used in place of the application print settings included in the print instruction data.

On the contrary, when the setting application 113 is not activated from the application 110, the print module 114 generates print data by using the document data included in the print instruction data and the application print settings included in the print instruction data.

The print module 114 provides the generated print data to the OS 115.

The OS 115 sends the print data to the printer 120 via the I/F unit 103 to make it execute printing.

By configuring the printer driver 111 as described above, the present embodiment can be implemented only by changing the configuration of the printer driver 111 without changing the application 110 for creating or printing a document.

Figure 3A:
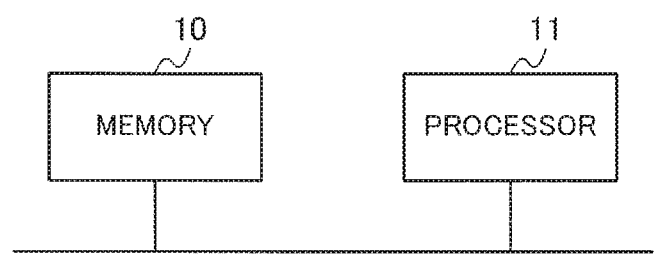
FIGS. 3A and 3B are block diagrams illustrating examples of hardware configurations.

As shown in FIG. 3A, for example, part or all of the control unit 105 described above can be implemented by a memory 10 and a processor 11 such as a CPU (Central Processing Unit) for executing a program stored in the memory 10. In other words, the information processing device 100 can be implemented by a computer. Such a program may be provided through a network or may be recorded on a recording medium. That is, such a program may be provided as a program product, for example.

Figure 3B:
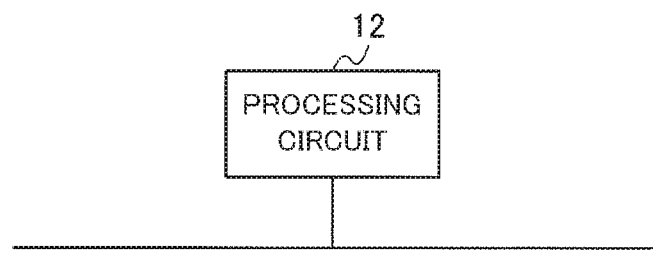

Further, as shown in FIG. 3B, part or all of the control unit 105 can be implemented by a processing circuit 12 such as, for example, a single circuit, a composite circuit, a programmed processor, a parallel programmed processor, an ASIC (Application Specific Integrated Circuit) or an FPGA (Field Programmable Gate Array).

As described above, the control unit 105 can be implemented by processing circuitry.

It should be noted that the storage unit 104 may be implemented by a memory 10 shown in FIG. 3A or another storage device.

The input unit 101 can be implemented by an input device such as a keyboard or a mouse.

The display unit 102 can be implemented by a display device such as a display monitor.

Figure 4:
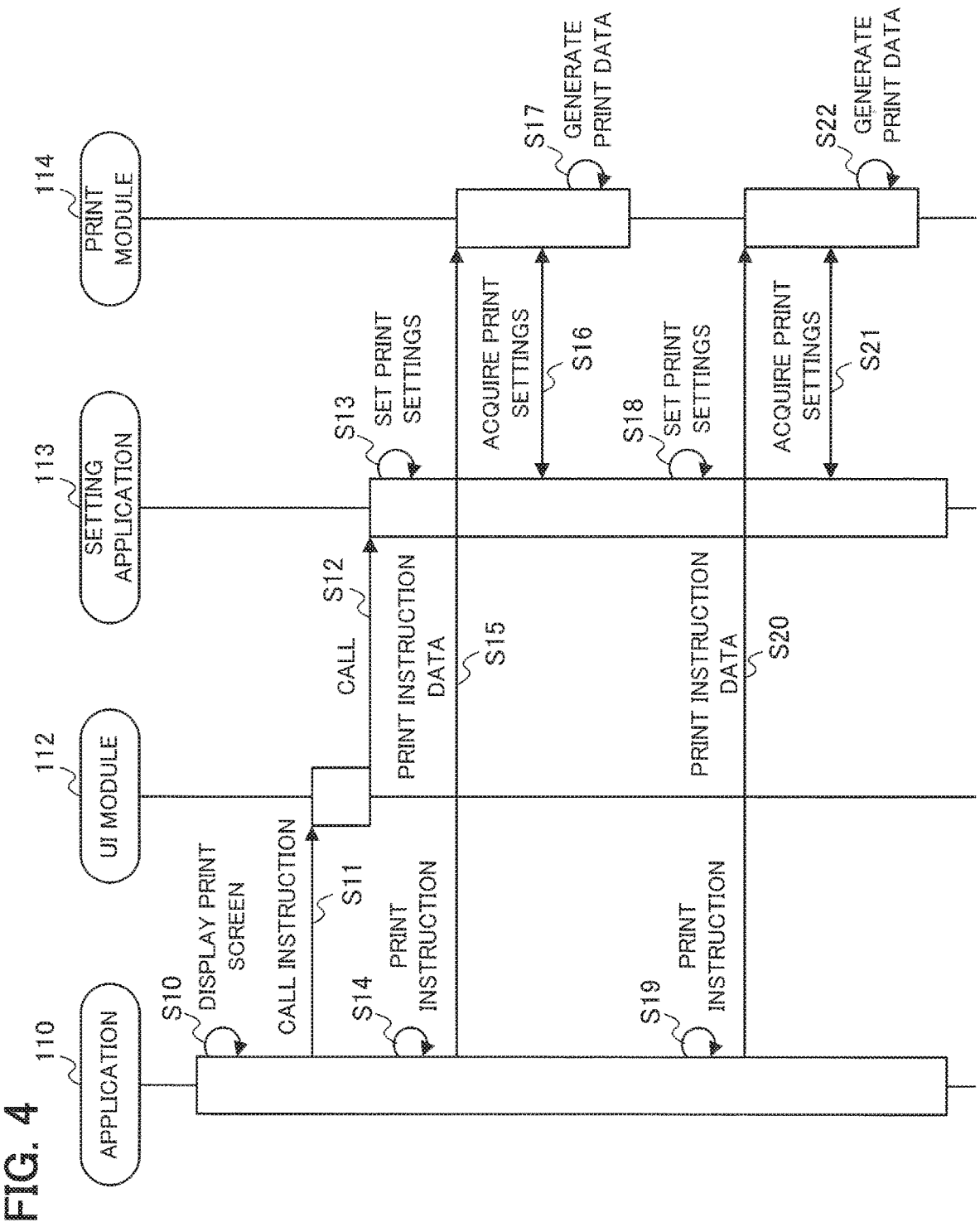
FIG. 4 is a sequence diagram representing an operation in which the information processing device performs setting print settings from an application and causes a printer to execute printing.

FIG. 4 is a sequence diagram representing an operation in which the information processing device 100 sets print settings from the application 110 and causes the printer 120 to execute printing.

In order to instruct printing of a document as a print object in the application 110, for example, when a user selects a print menu item from a menu of the applications, the application 110 causes the display unit 102 to display a print screen (S10).

When the user selects the property of the printer 120 on the print screen, the application 110 provides a call instruction of the print setting screen to the UI module 112 (S11). The property selection corresponds to a display instruction for displaying the print setting screen.

When receiving a call instruction of the print setting screen, the UI module 112 calls the setting application 113 to activate the setting application 113 (S12).

When being activated, the setting application 113 causes the display unit 102 to display a print setting screen separately from the application process, and accepts that print settings are set by the user (S13). Here, it is assumed that the setting application 113 displays a screen similar to a print setting screen displayed by the conventional printer driver.

When the user inputs an execution instruction by selecting the print button on the print screen displayed by the application 110 (S14), the application 110 provides the print instruction data including the document data and the application print settings to the print module 114 (S15). The execution instruction by selecting the print button corresponds to the print instruction.

When receiving the print instruction data, the print module 114 acquires, from the setting application 113, the driver print settings which are the current print settings set on the print setting screen (S16).

Then, the print module 114 generates print data for causing the printer 120 to execute printing by using the document data included in the print instruction data and the driver print settings (S17). Here, the application print settings included in the print instruction data are discarded. The generated print data is sent to the printer 120 via the OS 115 and the I/F unit 103, and printing is performed by the printer 120.

When the user wants to change the print settings based on the print result of the printer 120, the user changes the print settings on the print setting screen displayed on the display unit 102 (S18).

When the user inputs an execution instruction by selecting the print button on the print screen displayed by the application 110 (S19), the application 110 provides the print module 114 with the print instruction data including the document data included in the print instruction data and the application print settings (S20).

When receiving the print instruction data, the print module 114 acquires, from the setting application 113, the driver print settings which are the current print settings set on the print setting screen (S21). Here, since the user has changed the print settings in step S18, it is assumed that the driver print settings acquired in step S18 are different from the driver print settings acquired in step S16.

Then, the print module 114 generates print data for causing the printer 120 to execute printing by using the document data included in the print instruction data and the driver print settings (S22). Here, the application print settings included in the print instruction data are discarded. The generated print data is sent to the printer 120 via the OS 115 and the I/F unit 103, and printing is executed by the printer 120.

As described above, with the information processing device 100 according to the present embodiment, the printer 120 can execute printing while the print setting screen is being displayed on the display unit 102. Further, the information processing device 100 can change the print settings while the print setting screen is displayed on the display unit 102, and the printer 120 can be caused to execute printing with the changed print settings while the print setting screen is being displayed.

Figure 5:
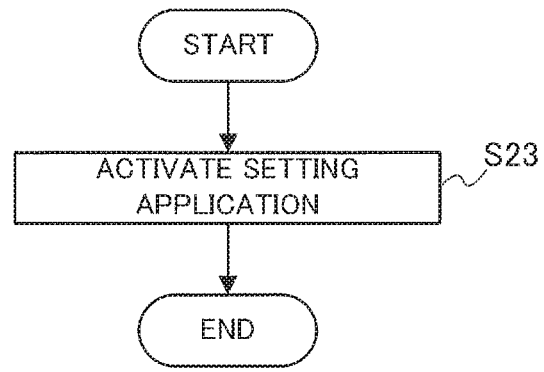
FIG. 5 is a flow chart representing an operation in a UI module.

FIG. 5 is a flowchart representing an operation of the UI module 112.

The UI module 112 is activated upon receipt of a call instruction of the print setting screen of the printer driver 111 from the application 110, and starts the operation shown in FIG. 5.

The UI module 112 activates the setting application 113 by calling the setting application 113 in a modeless dialogue (S23).

The UI module 112 terminates its operation when the setting application 113 is activated.

Figure 6:
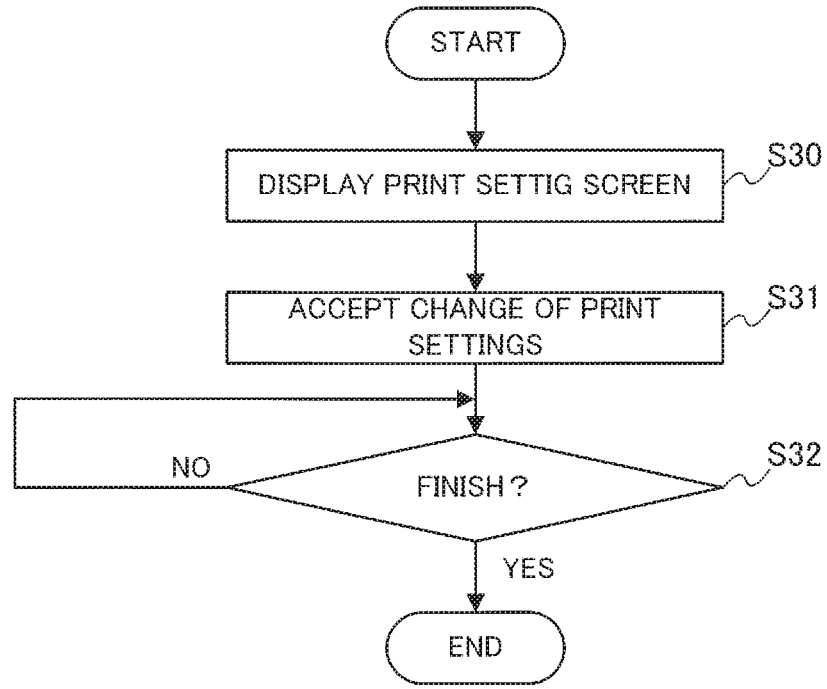
FIG. 6 is a flow chart representing an operation of a setting application.

FIG. 6 is a flowchart representing an operation of the setting application 113.

The setting application 113 is activated when called from the UI module 112, to start the operation shown in FIG. 6.

The setting application 113 causes the display unit 102 to display a print setting screen for changing print settings of the printer driver 111 (S30).

The setting application 113 receives the change of the print settings by receiving an operation from the user via the input unit 101 on the print setting screen (S31).

When the end button is selected on the print setting screen via the input unit 101 (Yes in S32), the setting application 113 terminates the operation and closes the displayed print setting screen. When terminating the operation, the setting application 113 causes the storage unit 104 to store the contents set on the print setting screen as driver print settings. When the application 110 is terminated, the printer driver 111 makes unusable the driver print settings stored in the storage unit 104 by deleting them, for example.

Figure 7:
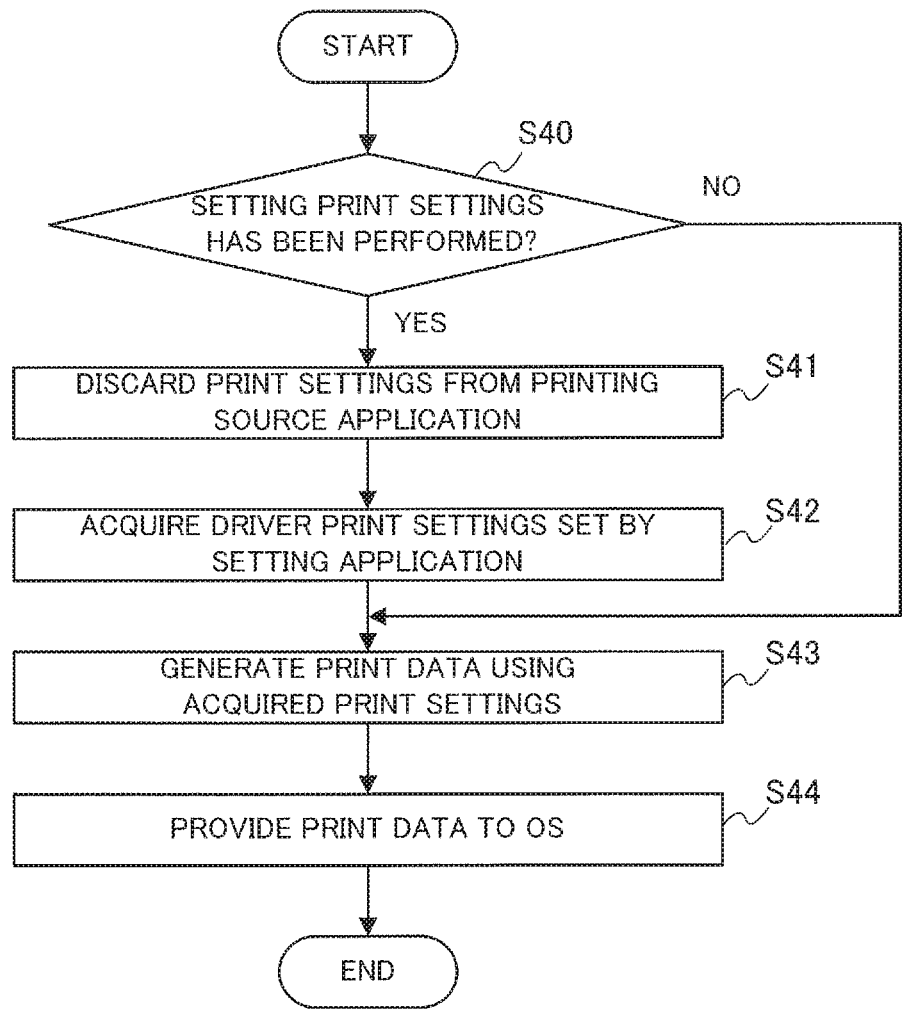
FIG. 7 is a flow chart representing an operation of a print module.

FIG. 7 is a flowchart representing an operation of the print module 114.

The print module 114 is activated when the printer driver 111 receives the print instruction data from the application 110, and starts the operation shown in FIG. 7.

The print module 114 determines whether or not print settings have been set in the setting application 113 (S40). For example, if the setting application 113 is active and the print setting screen is displayed on the display unit 102, or if the driver print settings are stored in the storage unit 104 by terminating the setting application 113 after the setting application 113 is activated by the application 110, the print module 114 determines that the print settings in the setting application 113 have been set. If the print settings have been set (Yes in S40), the process proceeds to step S41, and if the print settings have not been set (No in S40), the process proceeds to step S43.

In step S41, the print module 114 deletes the application print settings included in the print instruction data, thereby discarding the print settings provided by the printing source application 110.

Then, the print module 114 acquires the driver print settings set by the setting application 113 (S42). For example, when the setting application 113 is active, the print module 114 acquires the driver print settings from the setting application 113 by making a request of the setting application 113. In the case where the setting application 113 has been terminated, the driver print settings stored in the storage unit 104 are acquired. Then, the process proceeds to step S43.

In step S43, the print module 114 generates print data in accordance with the activation state of the setting application 113 (S43).

For example, if the setting application 113 is activated during the period from the activation to the termination of the application 110, the print module 114 can acquire the driver print settings in step S42. Therefore, in such a case, the print module 114 generates print data by using the document data included in the print instruction data and the driver print settings acquired in step S42.

On the contrary, if the setting application 113 is not activated during the period from the activation to the termination of the application 110, the print module 114 generates print data using the document data and the application print settings included in the print instruction data.

Then, the print module 114 provides the generated print data to the OS 115, thereby sending the print data from the OS 115 to the printer 120 via the I/F unit 103 to execute printing (S44).

As described above, by activating the application 110 and the setting application 113 for displaying the print setting screen in separate processes, the information processing device 100 according to the present embodiment can change the print settings and execute the printing while both screens are displayed. Therefore, the print settings can be adjusted and printing can be executed while the print setting screen is displayed on the display unit 102. Accordingly, it is possible to omit the troublesome work of displaying the print setting screen, changing the print settings, and closing the print setting screen every time printing is executed. In particular, in the case of adjusting a setting value in a deep layer of the print setting screen, it is possible to save the trouble of reaching the deep layer of the print setting screen each time.

In the embodiment described above, the information processing device 100 causes the printer 120 to perform printing, but the present embodiment is not limited to such an example. In place of the printer 120, any print device having a printing function, such as an MFP (MultiFunction Peripheral), a copying machine or a facsimile machine, may be used.

REFERENCE SIGNS LIST 100 information processing device, 101 input unit, 102 display unit, 103 I/F unit, 104 storage unit, 105 control unit, 110 application, 111 printer driver, 112 UI module, 113 setting application, 114 print module, 115 OS, 120 printer

What is claimed is:

1. A print control device that causes a print device to perform printing, comprising:
    processing circuitry that executes an application for processing a print object that is an object to be printed by the print device and a printer driver for controlling the print device;
    a display device that displays a screen; and
    an input device that receives an instruction,
    wherein when the processing circuitry receives an instruction to display a print setting screen for setting print settings of the print device in the application through the input device, the processing circuitry executes the printer driver and causes the display device to display the print setting screen in a modeless dialogue in which use of functions in the application is not restricted to setting print settings,
    wherein when the processing circuitry receives an instruction to print the print object in the application through the input device after the print setting screen is displayed, the processing circuitry executes the printer driver to cause the print device to print the print object by using driver print settings that are print settings set in the print setting screen while the print setting screen is displayed on the display device,
    wherein when the processing circuitry receives the instruction to display the print setting screen in the application, the processing circuitry provides a call instruction for calling the print setting screen to the printer driver, and
    wherein the printer driver comprises:
        a first module that is activated in response to the call instruction;
        a second module that is activated by being called from the first module, displays the print setting screen on the display device in the modeless dialogue, and accepts that the driver print settings are set; and
        a third module for generating print data for printing the print object by using the driver print settings.

2. The print control device according to claim 1,
    wherein when the processing circuitry receives the instruction to print the print object in the application, the processing circuitry provides print object data as data of the print object and application print settings as print settings set in the application to the third module, and
    wherein the processing circuitry executes the third module to generate the print data by using the driver print settings instead of the application print settings.

3. The print control device according to claim 1, further comprising a memory,
    wherein when the processing circuitry receives an instruction to close the print setting screen in the second module via the input device, the processing circuitry stores the driver print settings in the memory, and
    wherein the processing circuitry executes the third module to generate the print data by using the driver print settings stored in the memory.

4. The print control device according to claim 2, further comprising a memory,
    wherein when the processing circuitry receives an instruction to close the print setting screen in the second module via the input device, the processing circuitry stores the driver print settings in the memory, and
    wherein the processing circuitry executes the third module to generate the print data by using the driver print settings stored in the memory.

5. The print control device according to claim 1, further comprising an interface capable of being connected to the print device,
    wherein the processing circuitry causes the print device to perform printing by sending the print data to the print device through the interface.

6. The print control device according to claim 2, further comprising an interface capable of being connected to the print device,
    wherein the processing circuitry causes the print device to perform printing by sending the print data to the print device through the interface.

7. The print control device according to claim 3, further comprising an interface capable of being connected to the print device,
wherein the processing circuitry causes the print device to perform printing by sending the print data to the print device through the interface.

8. The print control device according to claim 4, further comprising an interface capable of being connected to the print device,
wherein the processing circuitry causes the print device to perform printing by sending the print data to the print device through the interface.

9. A non-transitory computer-readable medium storing a program that causes a computer to function as a print control device for causing a print device to perform printing, wherein
the program causes the computer to provide functions of:
a processing unit that includes a first module, a second module, and a third module, and that controls the print device;
a display device that displays a screen; and
an input device that receives an instruction,
wherein when the processing unit receives an instruction to display a print setting screen for setting print settings of the print device through the input device in an application executed by the processing unit, the processing unit causes the display device to display the print setting screen on the display device in a modeless dialogue in which use of functions in the application is not restricted to setting the print setting,
wherein when the processing unit receives an instruction to print the print object in the application through the input device after the print setting screen is displayed, the processing unit causes the print device to print the print object by using driver print settings that are print settings set in the print setting screen while the print setting screen is displayed on the display device,
wherein when the processing unit receives the instruction to display the print setting screen in the application, the processing unit provides a call instruction for calling the print setting screen to the first module to activate the first module,
wherein the second module is activated by being called from the first module, displays the print setting screen on the display device in the modeless dialogue, and accepts that the driver print settings are set, and
wherein the third module generates print data for printing the print object by using the driver print settings.

10. A print control method comprising:
receiving, in an application for processing a print object that is an object to be printed by a print device, an instruction to display a print setting screen for setting print settings of the print device, and displaying the print setting screen in a modeless dialogue in which use of functions in the application is not restricted to setting print settings, by executing a printer driver for controlling the print device, the printer driver including a first module, a second module and a third module;

receiving an instruction to print the print object in the application through the input device after the print setting screen is displayed, and printing the print object by using driver print settings that are print settings set in the print setting screen while the print setting screen is displayed, by executing the printer driver; and upon receiving the instruction to display the print setting screen in the application,
providing a call instruction for calling the print setting screen to the first module to activate the first module, to thereby call the second module;
activating the second module in response to being called by the first module, to thereby display the print setting screen in the modeless dialogue, and accept, by the second module, the driver print settings being set; and
generating, by the third module, print data for printing the print object by using the driver print settings.

* * * * *